2,891,017

MANUFACTURE OF FINELY POROUS MATERIALS USING NITROSAMINE AS GAS EVOLVING AGENT

Rudolf Kern, Neustadt, Wilhelm N. Grohs, Heidelberg, and Friedrich Blumel, Mannheim-Kafertal-sud, Germany, assignors to Rhein-Chemie G.m.b.H., Mannheim-Rheinau, Germany No Drawing. Application August 24, 1956
Serial No. 605,962

Claims priority, application Germany August 26, 1955

10 Claims. (Cl. 260—2.5)

This invention relates to a process for the manufacture of finely porous organic materials of macromolecular structure, such as those of rubber or synthetic resins, by heating the material in the presence of certain blowing agents which evolve gas by chemical decomposition.

The blowing agents impart a porous structure to the material by evolving gas. The gas is evolved during a heat treatment to which rubber or synthetic resin is subjected. The blowing of the mass causes small gas bubbles to become embedded in its structure, and reduces the specific gravity and heat conductivity of the material. The porous structure of the material is fixed by vulcanisation or a gelatinising process.

This method of rendering rubber or synthetic resins porous is used, more especially, for making products of low specific gravity and low heat conductivity such as, for example, the soles of shoes, mats, cushions, etc. However, the process is also applicable when porosity as such is required, or for absorption purposes in chemical industry.

The blowing agents used in the process of the present invention are nitrosamines. Of particular value are nitrosamines which contain two or more nitrosamine groups, but contain no aryl or substituted aryl radicals, and especially di-N-nitroso-pentamethylene tetramine. There may also be used, for example, other polymethylene nitrosamines, for example di-N-nitroso-piperazine and trimethylene trinitrosamine, and compounds containing two or more groups of the formula —Co.N(alkyl)NO, for example, succin-bis-(N-nitrosomethylamide).

The present invention is based on the observation that the action of these gas-evolving blowing agents can be improved by using them in conjunction with surface-active agents which are substances possessing the property of lowering surface tension. Surface-active agents in the sense of the present invention are described in Schwartz-Perry, Surface Active Agents, Interscience Publishers, Inc., New York, 1949, pages 13–20. The surface-active agent may be mixed with the material which is to be rendered porous, so that the former is brought into contact with the blowing agent only when the latter is mixed with the material to be rendered porous. Alternatively, the surface-active agent may first be mixed with the blowing agent, advantageously by means of apparatus such as a roller mill, colour mill, colloid mill or the like, so that a homogeneous mixture is obtained. In order to minimise or eliminate decomposition of the blowing agent during milling, a roller mill having water-cooled rolls may be employed.

Advantageously, the blowing agent may be used in the form of an undried press cake containing, for example, about 7.5% by weight of water, and this press cake may be compounded with the surface-active agent by milling in a roller mill and thereby obtained in an especially valuable finely divided form. Conveniently, the surface-active agent may be added in stages.

In some cases it is advantageous to form the blowing agent in the presence of the surface-active agent, so that the blowing agent is obtained in a very finely divided form.

It is especially advantageous in the process of this invention to use the blowing agent in a form such that substantially all the blowing agent has a particle size not greater than 4 microns, and the greater part thereof should have a particle size not greater than 1.5 microns.

Any surface-active agent may be used in the process of the present invention, for example, soaps, sodium alkyl sulphates, sulphated ethylene oxide condensates containing in the ether or ester group more than 8 carbon atoms, sulphated alkoxy-polyglykol ethers, sulphonated taurine derivatives, alkane sulphonates, alkyl-aryl sulphonates, for example, sodium dodecyl-benzene sulphonate, amide sulphonates of substituted anilines, betaines or quarternary ammonium salts containing radicals of high molecular weight, for example, cetyl-trimethyl-ammonium bromide, cetyl-pyridinium bromide, alkyl-phenoxyethyl-pyridinium bromides, alkyl-phenoxyethyl-trimethylammonium bromides, dodecylbenzyl-trimethylammonium chloride, oleyl-cetyl-dimethyl-ammonium chloride, tris-(alkoxyalkyl)-alkylammonium salts or tetrahydronaphthyl-methyl-dodecyl-di-methyl-ammonium chloride. It is preferred, however, to use a nonionic surface-active agent, for example, amine oxides, or esters of polyhydric alcohols or carbohydrates, for example, esters of sucrose or sorbitan with stearic acid or palmitic acid and the like, and especially derivatives of polyalkylene glycols, for example, condensation products of ethyene oxide or a mixture of ethylene oxide and propylene oxide with an amine, a phenol, an acids amide, a fatty alcohol or the like. Thus, there may be mentioned condensates of fatty alcohols with 3–25 molecular proportions of ethylene oxide and/or propylene oxide.

Suitable proportions of the surface-active agent and the nitrosamine are from 5% to 50%. Within these limits no reduction in blowing power takes place.

By the addition of the surface-active agent the action of the blowing agent is unexpectedly improved in several ways. The gas pores in the finished product are more uniformly distributed and are finer, and the product has a lower specific gravity and a lower heat conductivity.

As substances which may be rendered finely porous by the process of the present invention there may be mentioned natural rubber and synthetic rubber-like materials, for example synthetic rubbers obtained by polymerising 2-chlorobutadiene-1:3, butadiene-1:3, styrene, acrylonitrile, methyl methacrylate or mixtures thereof, isocyanate-modified polyesters and polyesteramides, phenol-formaldehyde resins, urea-formaldehyde resins, alkyd resins, acrylic resins and vinyl resins.

In making cured rubbers of finely porous character the rubber may be mixed with a curing agent, the surface-active substance and the nitrosamine compound, and the mixture heated to effect blowing and curing, and in making synthetic resins of finely porous character resin monomer or partially polymerised resin may be mixed with the surface-active substance and the nitrosamine and the mixture heated to effect polymerisation and blowing.

Advantageously, a proportion of urea may also be included in the mixture of uncured rubber or synthetic resin, blowing agent and surface-active agent. The urea has the property of reducing the odour possessed by the cured product, and may readily be incorporated as a paste either by milling the urea with the surface-active agent, or by milling the urea with the blowing agent and surface-active agent. A suitable proportion of urea is from 25% to 200% on the weight of the blowing agent.

The invention is illustrated by the following examples, in which the parts are by weight. In these examples, which describe rubber or synthetic resin mixes, two comparative tests A and B are carried out, tests A being carried out with a blowing agent alone, and tests B with a blowing agent and also a substance lowering the surface tension. In all cases the vulcanisates obtained in tests B have their pores more finely and more uniformly distributed than in the case of the vulcanisates obtained in tests A. This applies also to those examples in which this result is not specifically mentioned. Furthermore, in tests B the volume of the body removed from the mould was greater than that in the case of tests A. The increases in volume coupled with the lowering of the specific gravities of vulcanisates B were measured as compared with those of vulcanisates A and are given below in each test.

*Example 1*

A rubber mix was prepared having the composition:

| | |
|---|---|
| Pale crepe rubber | 50 |
| Copolymer of butadiene and styrene | 50 |
| Thio-β-naphthol | 0.4 |
| Calcium silicate | 60 |
| Kaolin | 30 |
| Paraffin wax | 1 |
| Stearic acid | 4 |
| White petroleum jelly | 5 |
| Zinc oxide | 4 |
| Mixture of dibenzthiazyl disulphide and diphenylguanidine | 1.5 |
| Sulphur | 2.5 |
| | 208.4 |

The crepe rubber, copolymer of butadiene and styrene and the thio-β-naphthol were first premasticated for 10 minutes on rollers heated at 100° C. and then the filling material, plasticiser, zinc oxide and finally the accelerator and sulphur were incorporated in the mixture at 50–60° C.

The final mixture was divided into two parts.

(A) 100 grams of the above mixture were mixed with 4.7 grams of a commercial preparation of dinitrosopentamethylene tetramine of 85 percent strength.

(B) 100 grams of the above mixture were mixed with 8.7 grams of a mixture prepared as follows:

47 grams of the same commercial preparation of dinitroso-pentamethylene tetramine of 85 percent strength were intimately triturated in a roller mill with 40 grams of a reaction product of 15 mols of ethylene oxide with a mixture of commercial fatty alcohols consisting of oleyl alcohol and cetyl alcohol having an iodine number of 40–45.

The two mixes (A) and (B) were each heated under exactly the same conditions in a vulcanising press in a closed mould for 20 minutes at 141° C. The dinitrosopentamethylene tetramine decomposed with the evolution of gases which imparted a porous structure to the rubber mix. The rubber mix was vulcanised at the said temperature. When the products were removed from the moulds it was apparent that the vulcanised test body (B) had a greater volume than the test body (A).

Vulcanisate (A) had a specific gravity of 0.206, and vulcanisate (B) a specific gravity of 0.149. Consequently, the specific gravity had been considerably lowered due to the presence of the substance lowering the surface tension.

*Example 2*

A rubber mix having the following composition was prepared:

| | |
|---|---|
| Pale crepe rubber (well masticated on cold rollers) | 100 |
| Kaolin | 68 |
| Stearic acid | 5 |
| White petroleum jelly | 15 |
| Zinc oxide | 5 |
| Mixture of dibenzthiazyldisulphide and diphenylguanidine | 0.75 |
| Sulphur | 2.5 |
| | 196.25 |

The rubber mix was divided into:

(A) To 100 grams of the rubber mix were added 1.17 grams of a commercial preparation of dinitroso-pentamethylene tetramine of 85 percent strength.

(B) To 100 grams of the rubber mix were added 2.17 grams of a paste prepared as follows:

117 grams of a commercial preparation of dinitrosopentamethylene tetramine of 85 percent strength were intimately triturated in a roller mill with 100 grams of the addition product of 15 mols of ethylene oxide with 1 mol of a commercial mixture of fatty alcohols having an iodine number of 40–45.

From each of the compositions (A) and (B) test bodies were moulded in the form of circular discs of 44 mm. diameter and 13 mm. thick. Each of these compositions was heated under exactly the same conditions for 60 minutes at 134° C. in a drying cabinet in which air circulated. The test bodies were thus inflated and increased both in diameter and thickness. The finished vulcanised test body (A) had a diameter of 71 mm. and a thickness of 16.2 mm. Its specific gravity was 0.350. The vulcanised test body (B) had a diameter of 75 mm. and a thickness of 18.0 mm. The specific gravity was 0.278.

6.5 grams of each of compositions (A) and (B) were placed in a glass test tube of 13 mm. diameter and rammed down tightly. Each composition thus formed a closed layer 40 mm. in height. Both mixtures were heated under exactly the same conditions for 60 minutes at 134° C. in a drying cabinet in which hot air circulated. The test samples were inflated and vulcanised. Sample (A) filled the test tube to a height of 80 mm. and sample (B) to a height of 92 mm. Thus, the sample to which the polyglycol ether fatty alcohol had been added had a larger total volume.

*Example 3*

(A) 100 grams of the rubber mix prepared as described in Example 2 were mixed with 1.17 grams of a commercial preparation of dinitroso-pentamethylene-tetramine of 85 percent strength.

(B) to 100 grams of the rubber mix were added 2.0 grams of a product prepared as follows:

50 grams of hexamethylene tetramine, 62 grams of sodium nitrite and 5 grams of the fatty alcohol polyglycol ether described in Example 1 were dissolved in 150 parts of water. 50 grams of glacial acetic acid were diluted with 100 grams of water. The dilute acetic acid was gradually introduced dropwise, while stirring, into the aforesaid solution. In this manner the dinitrosopentamethylene tetramine separates out as a solid substance in a finely divided form such that substantially all the nitrosamine has a particle size not greater than 1.5 microns. The latter product was separated from the liquid and cautiously dried. It then weighed about 55 grams. The product was mixed with 55 grams of the fatty alcohol polyglycol ether described in Example 1. Accordingly, the 2 grams of product mentioned under (B) above contained 1 gram of dinitroso-pentamethylene tetramine and 1 gram of the fatty alcohol polyglycol ether.

There were moulded from the above mixtures (A) and (B) test bodies in the form of circular plates having a diameter of 44 millimetres and a thickness of 13 millimetres. These plates were heated under exactly the same conditions for 60 minutes at 134° C. in a drying cabinet through which air circulated. The test bodies became inflated and thus increased in diameter and thickness.

The vulcanised test body (A) had a diameter of 71 millimetres and a thickness of 16.2 millimetres, and a specific gravity of 0.350. The vulcanised test body (B) had a diameter of 79 millimetres and a thickness of 14.8 millimetres and a specific gravity of 0.287.

*Example 4*

A rubber mix was prepared having the following composition:

| | |
|---|---|
| Pale crepe rubber Ia | 70 |
| Copolymer of butadiene and styrene | 30 |
| Zinc compound of pentachlorothiophenol | 0.3 |
| Zinc salt of rape seed oil fatty acid | 3.0 |

The mixture was premasticated for 10 minutes at 110° C. on rollers, and then there were added at 50–60° C.

| | |
|---|---|
| Calcium silicate | 50 |
| Kaolin | 30 |
| Zinc oxide | 7 |
| White petroleum jelly | 5 |
| Stearic acid | 3 |
| Sulphur | 2.6 |
| A mixture of mercapto-benzthiazole and dithiocarbamate | 1.0 |
| Total | 201.9 |

The mixture was divided into two parts:

(A) To 100 parts of the rubber mix were added 2 grams of a commercial preparation of dinitroso-pentamethylene tetramine of 85 percent strength.

(B) To 100 grams of the rubber mix were added 4 grams of a mixture prepared by intimately grinding together on a roller mill equal parts of the aforesaid commercial preparation of dinitropentamethylene tetramine and a commercial preparation of sodium dodecyl-benzene sulphonate of 60 percent strength.

Test bodies made from mixtures (A) and (B) were heated under exactly the same conditions for 12 minutes at 143° C. in a vulcanisation press in a closed mould, whereby inflation and vulcanisation occurred. The vulcanisate (A) had a specific gravity of 0.791 and vulcanisate (B) had a specific gravity of 0.736.

*Example 5*

The rubber mix described in Example 1 was divided into two portions.

(A) In 100 parts of the rubber mix were incorporated 4.7 grams of a commercial preparation of dinitroso-pentamethylene tetramine of 85 percent strength.

(B) In 100 grams of the rubber mix were incorporated 4.7 grams of a commerical prepartion of dinitroso-pentamethylene tetramine of 85 percent strength, and 4.0 grams of the reaction product of 15 mols. of ethylene oxide with 1 mol of a mixture of commercial fatty alcohols consisting of oleyl alcohol and cetyl alcohol having an iodine number of 40–45.

Test bodies were made from each of the above mixtures, and were heated under exactly the same conditions in a vulcanisation press in a closed mould for 20 minutes at 141° C. The vulcanised body (B), when removed from the mould, had a larger volume than the body (A). Body (A) had a specific gravity of 0.233, and body (B) a specific gravity of 0.171.

*Example 6*

A rubber mix was prepared having the composition:

| | |
|---|---|
| Pale crepe rubber Ia | 50 |
| Copolymer of butadiene and styrene | 50 |
| Zinc compound of pentachlorothiophenol | 0.4 |
| Active zinc oxide | 4 |
| Calcium silicate | 60 |
| Kaolin | 30 |
| White petroleum jelly | 5 |
| Stearic acid | 4 |
| A mixture of mercapto-benzthiazole and dithiocarbamate | 1 |
| Sulphur | 2.5 |
| | 206.9 |

The mixture was divided into two portions:

(A) In 100 grams of the rubber mix were incorporated 4 grams of a commercial preparation of nitroso-pentamethylene tetramine of 85 percent strength and 2 grams of urea.

(B) In 100 parts of the rubber mix were incorporated 4 grams of a commerical preparation of dinitrosopentamethylene tetramine and also 4 grams of a paste obtained by the intimate mechanical grinding on a roller mill of a mixture of 50 percent of urea, 25 percent of water and 25 percent of the fatty alcohol polyglycol ether described in Example 1.

Samples of the two mixtures (A) and (B) were heated under exactly the same conditions in a vulcanisation press for 15 minutes at 143° C. Sample (A) had a specific gravity of 0.683, and sample (B) a specific gravity of 0.597. Both vulcanisates were practically odourless.

*Example 7*

A rubber mix was prepared as described in Example 1. The mix was divided into two portions.

(A) 100 grams of the rubber mix were mixed with 4 grams of a commercial preparation of dinitrosopentamethylene tetramine of 85 percent strength and 3 grams of urea.

(B) 100 grams of the rubber mix were mixed with 13.7 grams of a paste obtained by repeatedly and intimately grinding on a roller mill a mixture of 100 parts of a commercial preparation of dinitroso-pentamethylene tetramine of 85 percent strength, 75 grams of urea and 167 grams of the fatty alcohol polyglycol ether described in Example 1. The resulting paste was soft, homogeneous and had good keeping qualities.

The aforesaid 13.7 grams of paste therefore contained 4 grams of the said commercial preparation, 3 grams of urea and 6.7 grams of the fatty alcohol polyglycol ether.

Samples of mixtures (A) and (B) were heated under exactly the same conditions in a vulcanisation press in a closed mould for 20 minutes at 141° C. Both vulcanisates were practically odourless. Vulcanisate (A) had a specific gravity of 0.573, and vulcanisate (B) a specific gravity of 0.482.

*Example 8*

A rubber mix was prepared having the following composition:

| | |
|---|---|
| Pale crepe rubber | 50 |
| Copolymer of butadiene and styrene | 50 |
| Thio-$\beta$-naphthol | 0.4 |

The above mixture was premasticated for 10 minutes at 110° C. and then mixed with:

| | |
|---|---|
| Active zinc oxide | 4 |
| Lamp black | 40 |
| Stearic acid | 4 |
| Paraffin wax | 1 |
| Petroleum white jelly | 5 |
| A mixture of dibenzthioacyl disulphide and diphenylguanidine | 1.5 |
| Sulphur | 2.5 |
| | 158.4 |

The resulting rubber mix was divided into two portions:

(A) In 100 parts of the rubber mix 4.7 grams of a commercial preparation of dinitroso-pentamethylene tetramine of 85 percent strength were incorporated.

(B) In 100 grams of the rubber mix 4.7 grams of the aforesaid commercial preparation of dinitrosopentamethylene tetramine and 4 grams of the fatty alcohol polyglycol ether used in Example 1 were incorporated.

Test bodies made from each mixture were heated under exactly the same conditions in a vulcanisation press in a closed mould for 20 minutes at 141° C. Vulcanisate (A) had a specific gravity of 0.520 and vulcanisate (B) a specific gravity of 0.462.

Example 9

An artificial plastic mix consisting of 50 percent of polyvinyl chloride and 50 percent of dioctyl phthalate was divided into two portions:

(A) 100 grams of the artificial plastic paste were intimately ground on a roller mill with 4.7 grams of a commercial preparation of dinitrosopentamethylene tetramine.

(B) 100 grams of the artificial plastic paste were intimately mixed on a roller mill with 4.7 grams of the aforesaid commercial preparation and 4.0 grams of the fatty alcohol polyglycol ether used in Example 1.

Test bodies of equal size were made from the two mixtures, and pregelatinised in a gas-tight mould for 10 minutes at 140° C. in a vulcanisation press, and then finally gelatinised for 40 minutes at 160° C. The test bodies were then allowed to cool to 40° C. in the closed moulds, and then removed from the moulds. The test bodies were then after-heated for 30 minutes at 90° C. in a drying cabinet operated with hot air. The test bodies had then become inflated. Product (A) had a specific gravity of 0.192, and product (B) a specific gravity of 0.172.

Example 10

3420 parts of dinitroso-pentamethylene tetramine were mixed in an open mixer with 580 parts of the condensation product of oleyl alcohol, of iodine number 50, with 15 molecular proportions of ethylene oxide, and then the mixture was passed through a three-roller mill fitted with water cooled rolls. The product was then mixed in an open mixer with a further 250 parts of the same oleyl alcohol-ethylene oxide condensate, and was passed again through the same mill in the same manner as before. The layer of material on the water-cooled roll mill was always very thin, and no decomposition, local overheating or gas formation occurred. The capacity of the mill used was 7.5 kg./hour, or 120 kg./hour using a roller mill having rolls 600 mm. in length.

The dinitroso-pentamethylene tetramine used in the process of this example was in the form of an undried filter-press cake which had been centrifuged to remove part of the water present, and had a water content of 7.5%.

The product finally obtained contained the dinitroso-pentamethylene tetramine in particles of the following sizes:

80% not greater than 1.5 microns.
20% between 1.5 microns and 3 microns

The product may be incorporated in rubber mixes in the manner described in Examples 1(B) and 2(B) whereby similarly improved vulcanisates are obtained.

Example 11

A rubber mix was prepared having the composition:

| | Parts |
|---|---|
| Natural pale crepe rubber | 70 |
| Copolymer of butadiene and styrene (Polysar SS 250) | 30 |
| Mastication agent (Vulcamel TBN), solution of 30 percent strength of β-thionaphthol in wax | 0.3 |
| Zinc salt of rapeseed oil fatty acid | 3.0 |
| Zinz oxide | 7.0 |
| Aqueous precipitated calcium silicate | 50.0 |
| Kaolin | 30.0 |
| White petroleum jelly | 5.0 |
| Stearic acid | 3.0 |
| Agent for protection against light on paraffin wax bases | 1.5 |
| Sulphur | 2.6 |
| Reaction product of mercaptobenzthiazole with cyclohexylamine | 0.7 |
| Anti-ageing agent/phenol condensation product (Nonox EX) | 1.0 |

The product prepared in the following manner was used as blowing agent.

Dinitroso-pentamethylene tetramine prepared by nitrosating hexamethylene tetramine in water was centrifuged and 75 parts of the centrifuged moist nitroso-product containing 14 percent of water were mixed with 25 parts of an octyl-phenol pentaglycol ether.

The paste was passed three times through a roller mill. The dinitroso-pentamethylene tetramine present in the paste then had a particle size not greater than 4 microns. The paste was then added to the mixture on the rollers in a proportion amounting to 4 percent calculated on the mixture of natural and synthetic rubber. The whole was then vulcanised for 10 minutes at 110° C. A microcellular vulcanisate was obtained having a specific gravity of 0.316.

Example 12

In order to determine the influence of storage at a raised temperature on a ground mixture of 80 parts of dinitroso-pentamethylene tetramine (water content of 14 percent) and 20 parts of an octyl-phenol pentaglycol ether, the paste was kept for 48 days at 40° C. and was then added to the rubber mix described in the preceding example in proportions of 4 percent and 4.9 percent calculated on the rubber. The mix was then vulcanised as described above. After storage for 2 days the vulcanisates had the following specific gravities at 20° C:

4% of blowing agent=0.350
4.9 of blowing agent=0.296

Example 13

A blowing agent having the following composition is prepared:

75 parts of dinitroso-pentamethylene tetramine (water content of 18 percent),
20 parts of octyl-phenol petaglycol ether,
5 parts of stearic acid monoethanolamide.

The above paste was ground in a colloid mill until the dinitroso-pentamethylene tetramine therein had a particle size of 1.5 microns. The blowing agent was then incorporated in a proportion amounting to 4 percent in the rubber mix described in Example 11, and treated in the same manner. After vulcanisation there was obtained a microcellular rubber having a specific gravity of 0.365.

Example 14

A rubber mix having the following composition was prepared:

| | Parts |
|---|---|
| Pale crepe | 70 |
| Copolymer of butadiene and styrene (Polysar SS 250) | 30 |
| Chlorothiophenol | 0.3 |
| Zinc oleate | 3.0 |
| Zinc oxide | 7.0 |
| Wet precipitated calcium silicate | 50.0 |
| Kaolin/natural product | 30.0 |
| Stearic acid | 3.0 |
| Agent for protection against light on paraffin wax bases | 1.5 |
| White petroleum jelly | 2.6 |
| Reaction product of mercapto benzothiazole with cyclohexylamine | 0.4 |

As a blowing agent there was used 4 percent of a ground mixture of 30 parts of commercial dinitrosopentamethylene tetramine and 14 parts of a solution of 50 percent strength of tetrahydronaphthylmethyl-dodecyl-dimethyl-ammonium chloride. The paste was passed twice through a 3-roller mill.

Vulcanisation for 15 minutes at 133° C. gave a vulcanisate of specific gravity 0.378. Vulcanisation for 12 minutes at 143° C. gave a vulcanisate of specific gravity 0.541.

Example 15

The rubber mix described in Example 14 was used under the same conditions as those described in that example, but with the use of a blowing agent consisting of a paste of 30 parts of commercial nitroso-pentamethylene tetramine with 10 parts of coconut oil fatty alcohol pentaethylene glycol ether.

The vulcanisates produced with different vulcanisation conditions had the following specific gravities:

15 minutes at 133° C., specific gravity=0.386
12 minutes at 143° C., specific gravity=0.483

Example 16

The rubber mix described in Example 14 was used with a blowing agent having the following composition:

30 parts of dinitroso-pentamethylene tetramine
3.5 parts of octadecenyl-pentaglycol ether
3.5 parts of sodium bicarbonate
3.5 parts of tetrahydronaphthylmethyl-dodecyl-dimethyl-ammonium chloride The paste of the above composition was prepared in a mixing machine and passed three times through a 3-roller mill. It was added to the rubber mix in a proportion amounting to 4 percent on the weight of the rubber. The mixture was vulcanised for 15 minutes at 133° C. The rubber so produced had a microcellular structure and a specific gravity of 0.395.

We claim:

1. A process for the manufacture of materials having a finely cellular substantially closed pore structure, which comprises intimately mixing a nitrosamine as a gas-evolving agent wherein the nitrosamine is selected from the group consisting of aliphatic and substituted aliphatic primary nitrosamines and aliphatic, cycloaliphatic, substituted aliphatic and substituted cycloaliphatic secondary nitrosamines containing at least two nitrosamine groups and a surface-active agent, intimately mixing the resulting mixture with an uncured organic material selected from the group consisting of natural rubber, vinyl polymerization products, phenoplasts, and aminoplasts, and subsequently curing the mixture with the aid of heat to produce a material having a substantially closed pore structure.

2. A process as claimed in claim 1 wherein the nitrosamine is in the humid state when mixed with the surface-active agent.

3. A process as claimed in claim 1, wherein the nitrosamine is prepared in the presence of the surface-active agent.

4. A process as claimed in claim 1, wherein urea is mixed with the nitrosamine and surface-active agent prior to incorporating the mixture in the organic material.

5. A process as claimed in claim 1, wherein the nitrosamine used is di-N-nitroso-pentamethylene tetramine.

6. A process as claimed in claim 1, wherein, prior to the curing operation, the mixture of the organic material, nitrosamine and surface-active agent is homogenized by means of a roller mill having cold rollers.

7. A process as claimed in claim 1, wherein substantially all the nitrosamine has a particle size not greater than 4 microns.

8. A process as claimed in claim 1, wherein the said surface-active agent is a non-ionic compound.

9. A process as claimed in claim 8, wherein the said surface-active agent is a condensation product of an alkylene oxide with a compound selected from the group consisting of amines, phenols, acid amides and fatty alcohols.

10. A process as claimed in claim 8, wherein the surface-active agent is a condensation product obtained by condensing a fatty alcohol with 3 to 25 mols of ethylene oxide per mol of fatty alcohol.

References Cited in the file of this patent

UNITED STATES PATENTS 2,466,826     Romaine     Apr. 12, 1949